US012741665B2

United States Patent
(12) United States Patent
Ratnoo et al.

(10) Patent No.: US 12,741,665 B2
(45) Date of Patent: Sep. 22, 2026

(54) METHOD AND SYSTEM FOR DYNAMICALLY CONTROLLING NAVIGATION OF AN AUTONOMOUS VEHICLE

(71) Applicants: Wipro Limited, Bangalore (IN); Indian Institute of Science, Bangalore (IN)

(72) Inventors: Ashwini Ratnoo, Bangalore (IN); Manas Sarkar, Kolkata (IN); R. Balaji Sunil Kumar, Bangalore (IN)

(73) Assignees: WIPRO LIMITED, Bangalore (IN); INDIAN INSTITUTE OF SCIENCE, Bangalore (IN)

( * ) Notice: Subject to any disclaimer, the term of this patent is extended or adjusted under 35 U.S.C. 154(b) by 525 days.

(21) Appl. No.: 17/804,898

(22) Filed: Jun. 1, 2022

(65) Prior Publication Data

US 2023/0311934 A1 Oct. 5, 2023

(30) Foreign Application Priority Data

Mar. 31, 2022 (IN) ............................ 202241019771

(51) Int. Cl.
*B60W 60/00* (2020.01)
*B60W 40/06* (2012.01)
(Continued)

(52) U.S. Cl.
CPC .......... *B60W 60/001* (2020.02); *B60W 40/06* (2013.01); *B60W 40/107* (2013.01);
(Continued)

(58) Field of Classification Search
CPC .. B60W 60/001; B60W 40/06; B60W 40/107; B60W 2556/45; B60W 2720/106;
(Continued)

(56) References Cited

U.S. PATENT DOCUMENTS 11,137,766 B2 * 10/2021 Gier ...................... G06F 9/4498
11,900,797 B2 * 2/2024 Ramamoorthy ...... B60W 40/04
(Continued)

FOREIGN PATENT DOCUMENTS

CN 109375632 B 3/2020

OTHER PUBLICATIONS

S.-H. Lee and C. C. Chung, "Autonomous-Driving Vehicle Control With Composite Velocity Profile Planning," in IEEE Transactions on Control Systems Technology, vol. 29, No. 5, pp. 2079-2091, Sep. 2021, doi: 10.1109/TCST.2020.3029713.
(Continued)

*Primary Examiner* — Sihar A Karwan
(74) *Attorney, Agent, or Firm* — Finnegan, Henderson, Farabow, Garrett & Dunner, LLP

(57) ABSTRACT

Disclosed herein is method and a navigation system for dynamically controlling navigation of an autonomous vehicle. In an embodiment, method comprises determining a trajectory path, comprising a plurality of path segments including at least one curved path segment and a straight path segment, by adjusting a plurality of waypoints in a base route of the autonomous vehicle and joining the plurality of waypoints using a predefined path planning model. Thereafter, a velocity profile distribution is generated for the autonomous vehicle by determining a start terminal velocity, an end terminal velocity and acceleration of the autonomous vehicle through each of the plurality of path segments in the trajectory path. Finally, a dynamic motion command is determined and applied to the autonomous vehicle based on the velocity profile distribution for dynamically controlling the navigation of the autonomous vehicle.

13 Claims, 8 Drawing Sheets

(51) Int. Cl.
*B60W 40/107* (2012.01)
*G05D 1/00* (2024.01)

(52) U.S. Cl.
CPC ....... *G05D 1/0212* (2013.01); *B60W 2556/45* (2020.02); *B60W 2720/106* (2013.01)

(58) Field of Classification Search
CPC ......... B60W 2556/50; B60W 60/0011; B60W 2720/103; G05D 1/0212; G05D 2107/13; G05D 2109/10; G05D 1/646; G05D 1/65; G05D 1/229
See application file for complete search history.

(56) References Cited

U.S. PATENT DOCUMENTS

| | | | | |
|---|---|---|---|---|
| 2016/0362118 | A1* | 12/2016 | Mollicone | G05D 1/0276 |
| 2020/0290611 | A1* | 9/2020 | Tang | B60W 30/143 |
| 2021/0001884 | A1* | 1/2021 | Alvarez | B60W 40/06 |
| 2022/0136837 | A1* | 5/2022 | Neeschal | G05D 1/0212 701/410 |
| 2022/0274625 | A1* | 9/2022 | Garimella | G06N 3/04 |
| 2023/0041975 | A1* | 2/2023 | Caldwell | B60W 60/0011 |

OTHER PUBLICATIONS

S. Upadhyay and A. Ratnoo, "Continuous-Curvature Path Planning With Obstacle Avoidance Using Four Parameter Logistic Curves," in IEEE Robotics and Automation Letters, vol. 1, No. 2, pp. 609-616, Jul. 2016, doi: 10.1109/LRA.2016.2521165.

Danwei Wang and Feng Qi, "Trajectory Planning for a Four-Wheel-Steering Vehicle," Proceedings of the 2001 IEEE International Conference on Robotics & Automation Seoul, Korea, pp. 3320-3325, May 21-26, 2001.

* cited by examiner

METHOD AND SYSTEM FOR DYNAMICALLY CONTROLLING NAVIGATION OF AN AUTONOMOUS VEHICLE

TECHNICAL FIELD

The present subject matter is, in general, related to autonomous vehicles, but not exclusively, to a method and system for dynamically controlling navigation of an autonomous vehicle.

BACKGROUND

Trajectory planning for autonomous vehicles is a broad area of concern and distributed across various scenarios like highway movement, narrow lane movement, factory or institutional campus movement, unorganized rough terrain movement etc. Each of these scenarios have a unique problem and so are the solution strategies required for handling each of these scenarios.

Most of the existing solutions are designed to address specific scenarios. For example, in some of the existing approaches, trajectory path is determined with a free space search algorithm or using a time elastic band search approach. Sometime, even quadratic and/or cubic distributions are used when there is an intimation of route waypoints. After that, a uniform velocity distribution is added to it as a spatial or temporal distribution. A motion cost optimization is applied to the path to get a modified path as well as the velocity. Cost optimization is also done based on multiple parameters like lane adherence, safe distance to obstacle, time of travel etc. However, there are some drawbacks in these approaches.

Firstly, the cost optimization cannot be done on any trajectory path with arbitrary curve. The number of curves highly impacts the optimization results in the existing approaches. Secondly, the existing approaches do not perform an end terminal velocity determination for the trajectory plan as it is a challenge since there is no pattern followed in the trajectory path segment. Further, the existing approaches do not consider the inherent nature of the trajectory path for terminal velocity calculation and there is no consideration of future route pattern for determining terminal velocity. The terminal velocity determination cannot be performed until the path segments or sub-segments have some uniqueness and uniformity. To facilitate this, a suitable trajectory path segment method and subsequent sub-segmenting method is also required, which is missing in the existing approaches. Moreover, the existing approaches do not use a holistic approach that starts from strategizing trajectory path laying and then proceeding with velocity distribution.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for dynamically controlling navigation of an autonomous vehicle. The method comprising determining, by a navigation system, a trajectory path, comprising a plurality of path segments including at least one curved path segment and a straight path segment, by adjusting a plurality of waypoints in a base route of the autonomous vehicle and joining the plurality of waypoints using a predefined path planning model. Further, the method comprises determining a start terminal velocity, an end terminal velocity and acceleration of the autonomous vehicle through each of the plurality of path segments in the trajectory path. Furthermore, the method comprises generating a velocity profile distribution for the autonomous vehicle based on the start terminal velocity, the end terminal velocity and the acceleration of the autonomous vehicle through each of the plurality of path segments. Finally, the method comprises dynamically controlling the navigation of the autonomous vehicle by applying a dynamic motion command generated based on the velocity profile distribution.

Further, the present disclosure relates to a navigation system for dynamically controlling navigation of an autonomous vehicle. The navigation system comprises a processor and a memory, communicatively coupled to the processor. The memory stores processor-executable instructions, which on execution, cause the processor to determine a trajectory path, comprising a plurality of path segments including at least one curved path segment and a straight path segment, by adjusting a plurality of waypoints in a base route of the autonomous vehicle and joining the plurality of waypoints using a predefined path planning model. Further, the instructions cause the processor to determine a start terminal velocity, an end terminal velocity and acceleration of the autonomous vehicle through each of the plurality of path segments in the trajectory path. Furthermore, the instructions cause the processor to generate a velocity profile distribution for the autonomous vehicle based on the start terminal velocity, the end terminal velocity and the acceleration of the autonomous vehicle through each of the plurality of path segments in the trajectory path. Finally, the instructions cause the processor to dynamically control the navigation of the autonomous vehicle by applying a dynamic motion command generated based on the velocity profile distribution.

Furthermore, the present disclosure relates to a non-transitory computer readable medium including instructions stored thereon that when processed by at least one processor, cause a navigation system to perform operations comprising determining a trajectory path, comprising a plurality of path segments including at least one curved path segment and a straight path segment, by adjusting a plurality of waypoints in a base route of the autonomous vehicle and joining the plurality of waypoints using a predefined path planning model. Further, the instructions cause the processor to determine a start terminal velocity, an end terminal velocity and acceleration of the autonomous vehicle through each of the plurality of path segments in the trajectory path. Further, the instructions cause the processor to generate a velocity profile distribution for the autonomous vehicle based on the start terminal velocity, the end terminal velocity and the acceleration of the autonomous vehicle through each of the plurality of path segments. Finally, the instructions cause the processor to control navigation of the autonomous vehicle by applying a dynamic motion command generated based on the velocity profile distribution.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
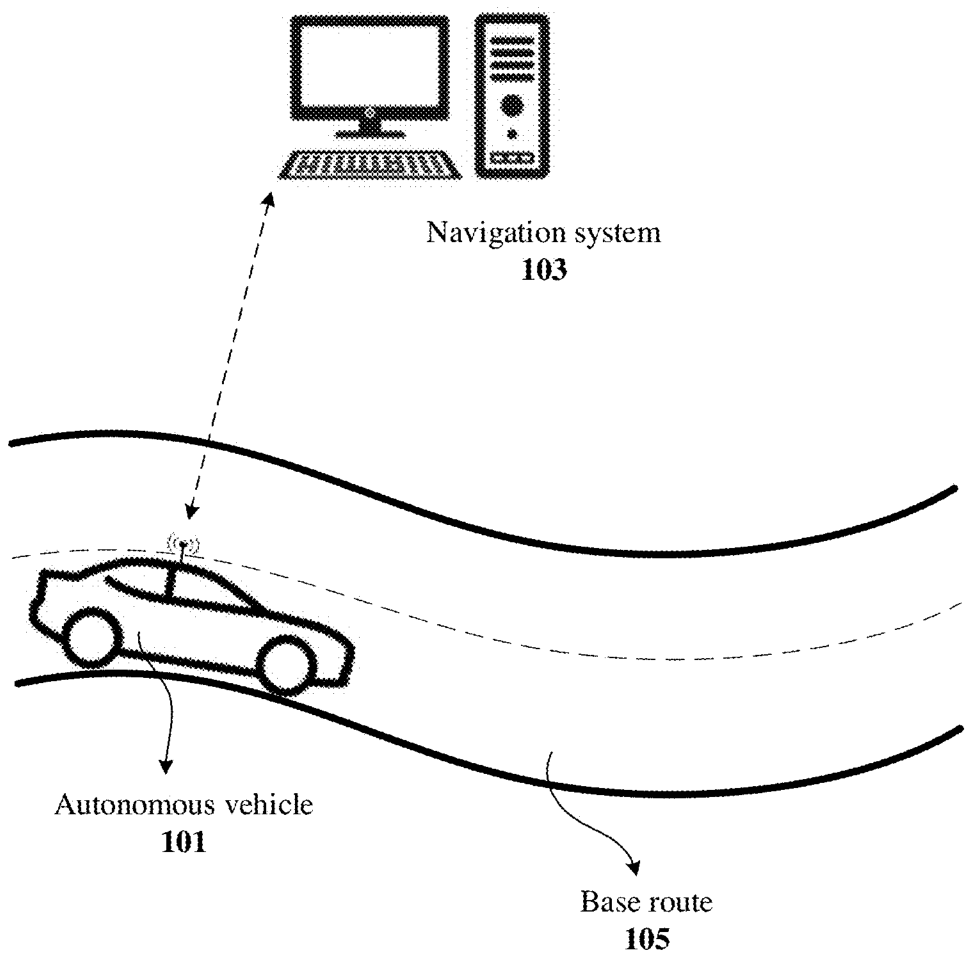
FIG. 1 illustrates an exemplary overview of dynamically controlling navigation of an autonomous vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The present disclosure relates to a method and a navigation system for dynamically controlling navigation of an autonomous vehicle. In an embodiment, the present disclosure provides a holistic solution that combines velocity profile generation with trajectory path segment generation to provide a generalized strategy for all scenarios. Also, the present disclosure lays a trajectory path with segments and sub-segments considering in-lane movement of the autonomous vehicle with obstacle avoidance and determines a continuous velocity-acceleration profile where the autonomous vehicle adheres strictly to the trajectory layout.

In other words, the present disclosure proposes a method of generating a trajectory path segments and unit trajectory sections and determining a break-up of the trajectory path segments into sub-segments (i.e., unit trajectory sections) based on some predetermined rules, such as four parameter logistic curve (4PL) distribution method. Further, the proposed method comprises determining a terminal velocity and acceleration for each unit trajectory sections of a curved sub-segment and a straight sub-segment for generating the velocity profile for unit trajectory sections of the curved sub-segments and straight sub-segments.

That is, once a full trajectory path is generated, the 4PL curve distribution is once again applied for generating the velocity profile for closest trajectory path segments of the autonomous vehicle. The 4PL curve distribution may be used to generate velocity profile continuously while the autonomous vehicle is navigating. With the velocity profile distribution, the autonomous vehicle receives the accelerated and decelerated velocity profile reference for all the straight and curved path segments in the trajectory path.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary overview of dynamically controlling navigation of an autonomous vehicle 101 in accordance with some embodiments of the present disclosure.

In an embodiment, the autonomous vehicle 101 may be an autonomous car or a self-driving car. Alternatively, the autonomous vehicle 101 may include any other commercial and/or non-commercial vehicle equipped with autonomous driving functionality. In an embodiment, the autonomous vehicle 101 may be connected to and/or interfaced with a navigation system 103. The navigation system 103 may be any computing device including, without limiting to, a desktop computer, a server or a smartphone. In an implementation, the navigation system 103 may be implemented external to the autonomous vehicle 101 (for example, as a remote server) and connected to the autonomous vehicle 101 using a suitable wireless communication network. In an alternative implementation, the navigation system 103 may be deployed within the autonomous vehicle 101, as a part of the Electronic Control Unit (ECU) or a navigation unit of the autonomous vehicle 101. In an embodiment, the proposed navigation system 103 may be also integrated to existing autonomous vehicles as an add-on functionality.

In an embodiment, the navigation system 103 may determine a trajectory path for the autonomous vehicle 101 by adjusting a plurality of waypoints in a base route 105 of the autonomous vehicle 101 and joining the plurality of waypoints using a predefined path planning model. In an embodiment, the base route 105 for the autonomous vehicle 101 may be generated using information of current location of the autonomous vehicle 101, which is collected through a Global Positioning System (GPS) configured in the autonomous vehicle 101, and information of a destination location of the autonomous vehicle 101. In an embodiment, the trajectory path may include a plurality of path segments may comprise at least one curved path segment and a straight path segment.

In an embodiment, subsequent to determining the trajectory path, the navigation system 103 may generate a velocity profile distribution for the autonomous vehicle 101. The velocity profile distribution may be generated by determining a start terminal velocity, an end terminal velocity and acceleration of the autonomous vehicle 101 through each of the plurality of path segments in the trajectory path. In an embodiment, the start terminal velocity may correspond to velocity of the autonomous vehicle 101 when the autonomous vehicle 101 is positioned at the start of a path segment. Similarly, the end terminal velocity may correspond to velocity of the autonomous vehicle 101 when the autonomous vehicle 101 is positioned at the end start of the path segment.

In an embodiment, after generating the velocity profile distribution for the autonomous vehicle 101, the navigation system 103 may determine and apply a dynamic motion command to the autonomous vehicle 101 based on the velocity profile distribution. The dynamic motion command may be provided to the autonomous vehicle 101 in a sequential manner, each time the autonomous vehicle 101 is moving to a new position, from where a new beginning of the path segment is considered. The dynamic motion command helps in controlling the navigation of the autonomous vehicle 101 throughout the trajectory path of the autonomous vehicle 101.

Figure 2:
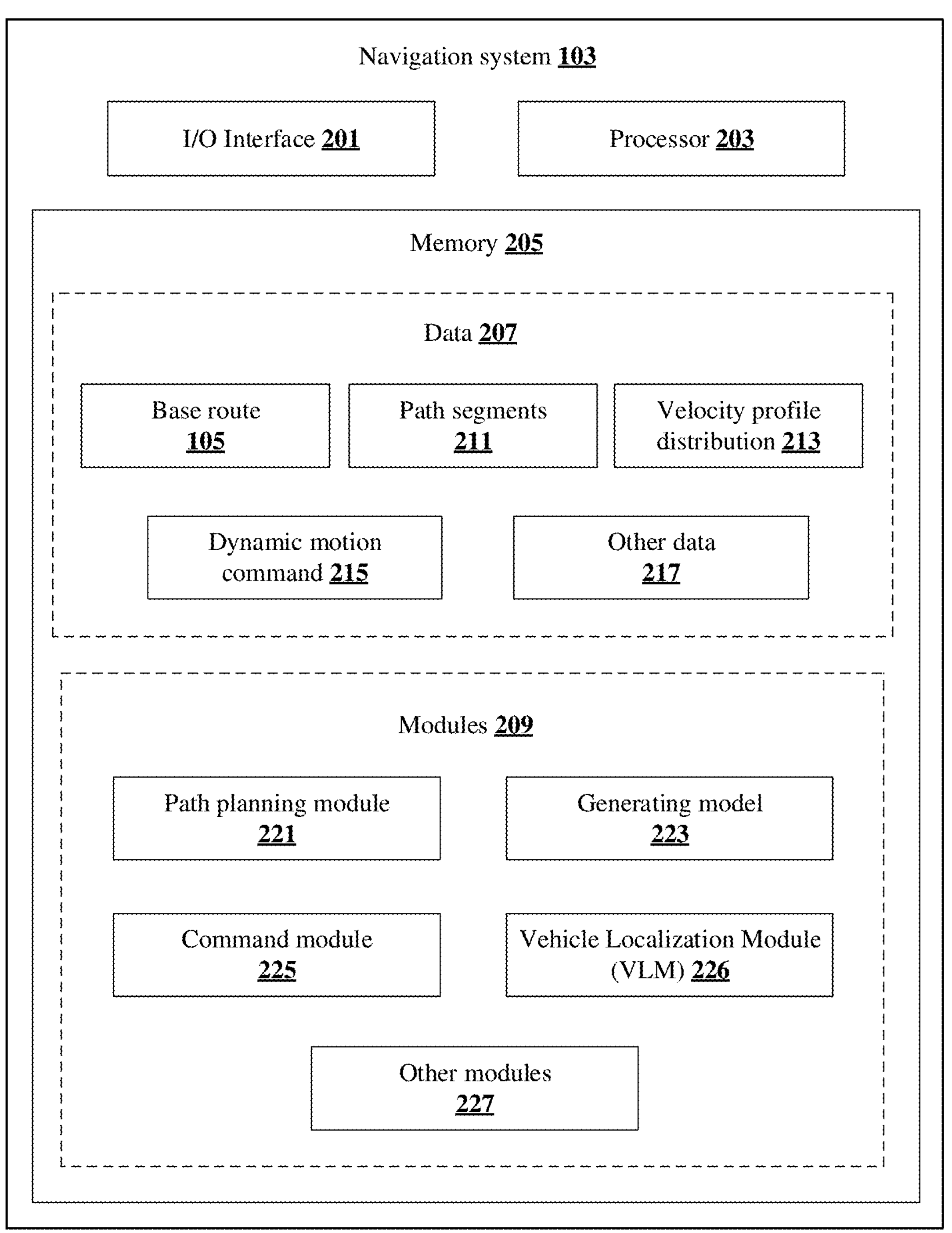
FIG. 2 shows a detailed block diagram of a navigation system in accordance with some embodiments of the present disclosure.

FIG. 2 shows a detailed block diagram of a navigation system 103 in accordance with some embodiments of the present disclosure.

In some implementations, the navigation system 103 may include an I/O interface 201, a processor 203 and a memory 205. The I/O interface 201 may be communicatively interfaced with a GPS unit of the autonomous vehicle 101 for collecting information related to location of the autonomous vehicle 101. Further, the I/O interface 201 may be used to connect the navigation system 103 to any user device, using which a user may issue one or more commands to the navigation system 103. The memory 205 may be communicatively coupled to the processor 203 and may store data 207 and one or more modules 209. The processor 203 may be configured to perform one or more functions of the navigation system 103 for dynamically controlling navigation of an autonomous vehicle 101, using the data 207 and the one or more modules 209.

In an embodiment, the data 207 stored in the memory 205 may include, without limitation, a base route 105, a plurality of path segments 211, a velocity profile distribution 213, dynamic motion command 215 and other data 217. In some implementations, the data 207 may be stored within the memory 205 in the form of various data structures. Additionally, the data 207 may be organized using data models, such as relational or hierarchical data models. The other data 217 may include various temporary data and files generated by the one or more modules 209 while performing various functions of the navigation system 103. As an example, the other data 217 may include, without limitation, source and destination information of a current journey of the autonomous vehicle 101 and information related to one or more obstacles along the trajectory path of the autonomous vehicle 101.

In an embodiment, the base route 105 of the autonomous vehicle 101 is a route between a current location and/or a source location of the autonomous vehicle 101 and the final/destination location of the autonomous vehicle 101. The base route 105 may be pre-determined using navigation tools such as GPS. In an embodiment, the base route 105 may not comprise any real-time information related to the path taken by the autonomous vehicle 101.

In an embodiment, the plurality of path segments 211 may include at least one curved path segment and a straight path segment. The curved path segment may correspond to a curved road and/or a turning in the path of the autonomous vehicle 101. Similarly, the straight path segment may correspond to a straight road in the path of the autonomous vehicle 101.

In an embodiment, the velocity profile distribution 213 may comprise information related to variation in velocity of the autonomous vehicle 101 through the plurality of path segments 211 in the trajectory path assigned for the autonomous vehicle 101. In the embodiment, the velocity profile distribution 213 helps in better control of acceleration and deceleration of the autonomous vehicle 101 when the autonomous vehicle 101 is traversing through the plurality of path segments 211.

In an embodiment, the data 207 may be processed by the one or more modules 209 of the navigation system 103. In some implementations, the one or more modules 209 may be communicatively coupled to the processor 203 for performing one or more functions of the navigation system 103. In an implementation, the one or more modules 209 may include, without limiting to, a path planning model 221, a generating module 223, a command module 225, a Vehicle Localization Module (VLM) 226 and other modules 231.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 231 may be used to perform various miscellaneous functionalities of the navigation system 103. It will be appreciated that such one or more modules 209 may be represented as a single module or a combination of different modules.

In an embodiment, the path planning model 221 may be configured for determining a trajectory path for the autonomous vehicle 101 with the help of a navigation initiator module, a base route planning module and a trajectory path segment generation module (not shown in FIG. 2).

In an embodiment, the navigation initiator module may be used for initiating the navigation process on the autonomous vehicle 101 to autonomously drive from a source location to a destination location. This module may provide a User Interface (UI) layer on an infotainment cluster of the autonomous vehicle 101. The UI with a map may be displayed to a user of the autonomous vehicle 101. The user may be able to see the current and/or initial location of the autonomous vehicle 101 as a source point in the map with the help of a GPS in the autonomous vehicle 101. In an embodiment, the navigation initiator module may provision the user to touch any point (on drivable road area only) on the map or use voice commands or any other methods to choose the destination point.

In an embodiment, the base route planning module may be configured to generate the base route 105 for the autonomous vehicle 101. The base route planning module may receive a source location and a destination location from the network initiator module and generate the base route 105 for navigation of the autonomous vehicle 101 from the source point (or the current position of the autonomous vehicle 101) to the destination point along the route on a 2-Dimensional (2D) High Definition (HD) map having lane and other information like, number of lanes, lane width, U-turn etc. The base route module may use an existing lane planning algorithm for generation of the base route 105.

In an embodiment, the trajectory path segment generation module may be configured for generating straight and curved trajectory path segments in the trajectory path using the 4PL curve.

In an embodiment, the generating module 223 may be configured for generating a velocity profile distribution 213 for the autonomous vehicle 101 based on a start terminal velocity, an end terminal velocity and acceleration of the autonomous vehicle 101 through each of the plurality of path segments 211 in the trajectory path. In an embodiment, the generating module 223 may determine the start and end terminal velocity and acceleration of the autonomous vehicle 101 across the trajectory path sub-segments that are immediately ahead of the autonomous vehicle 101, such that, the end terminal velocity and the acceleration depend on nature of the subsequent unit trajectory section, which is at least one of the straight path segments or the curved path segment. Finally, the generating module 223 may determine the velocity profile distribution 213 for a straight or curved trajectory path sub-segment or for a combined straight and curved trajectory path sub-segment based on the start and end terminal velocity and acceleration of the autonomous vehicle 101.

In an embodiment, the command module 225 may be configured for using the velocity profile distribution 213 and apply a dynamic motion command to the autonomous vehicle 101. In an embodiment, the command module 225 provides an indication to the Vehicle Localization Module (VLM) 226 about application of the motion command to the vehicle controller.

Subsequently, the VLM 226 determines a current position of the autonomous vehicle 101 on the HD map based on information including, without limiting to, vision sensor data, odometer readings and data obtained from an Inertial Measurement Unit (IMU) related to the autonomous vehicle 101, after the command module 225 applies the motion command. In an embodiment, the VLM 226 provides the current position (i.e., the new position of the autonomous vehicle 101) to the path planning model 221 for planning the next route and/or the trajectory path for the autonomous vehicle 101 starting from the new determined position.

Figure 3A:
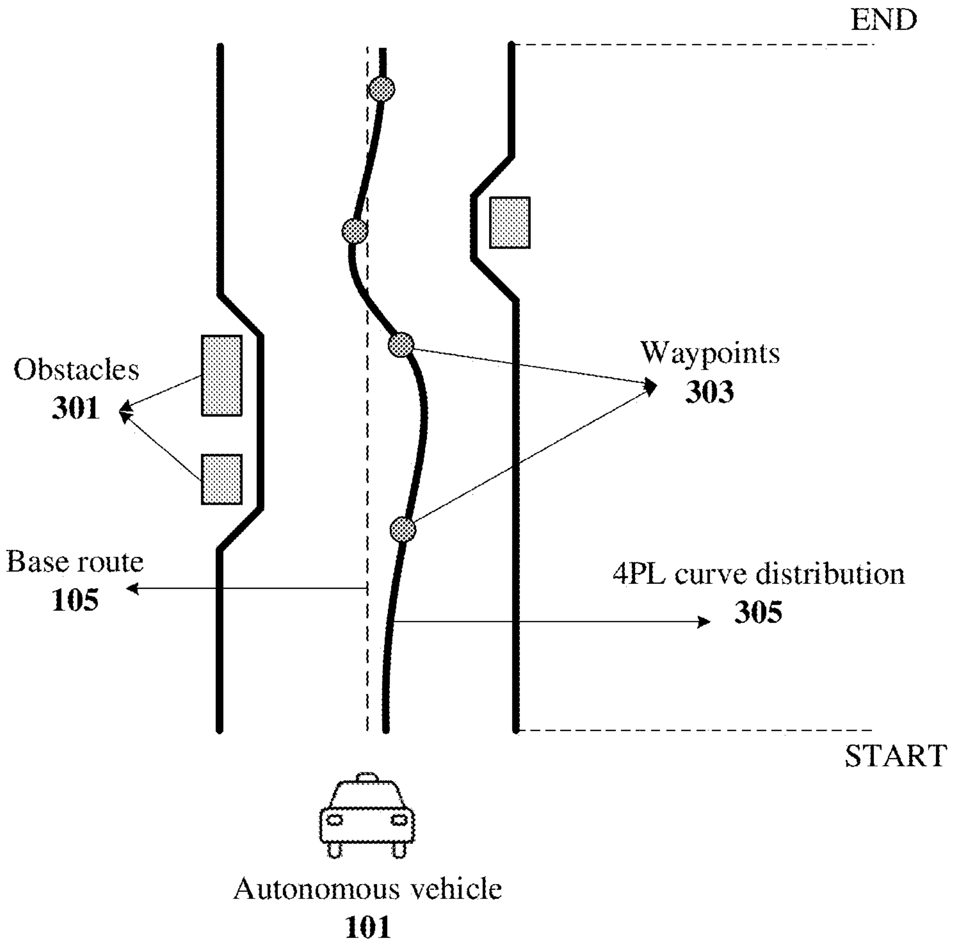
FIG. 3A shows an exemplary illustration of generating trajectory path for an autonomous vehicle in accordance with some embodiments of the present disclosure.

FIG. 3A provides an exemplary illustration of the path ('START' point to 'END' point) of the autonomous vehicle 101 between a source location and a destination location of the autonomous vehicle 101. In an embodiment, the base route 105 and/or the trajectory path of the autonomous vehicle 101 may comprise a plurality of obstacles 301 along the path of the autonomous vehicle 101. As an example, the obstacles 301 may be static or moving. Static obstacles may include hoardings, physical structures etc. The moving or non-static obstacles may include parked vehicles, slow-moving vehicles, pedestrians etc. In an embodiment, due to presence of obstacles 301 on the path of the autonomous vehicle 101, the autonomous vehicle 101 needs to dynamically adapt/modify the trajectory path. In such scenarios, the autonomous vehicle 101 has to deviate from the base route 105 and follow a trajectory along the 4PL curve distribution 305 comprising a plurality of waypoints 303.

In an embodiment, on the base route 105 or adjacent to the base route 105, major waypoints 303 may be determined, such that, two consecutive waypoints 303 can be joined to form one curved or straight segment. Further, unique properties of the curved segments and the straight segments may be determined on the base route 105 to form drivable trajectory using the 4PL distribution of the determined waypoints 303. As an example, the unique properties of the curved segments may include, without limiting to, a single highest curvature point, a monotonically increasing or decreasing curvature, a flexible terminal heading and the like.

Figure 3B:
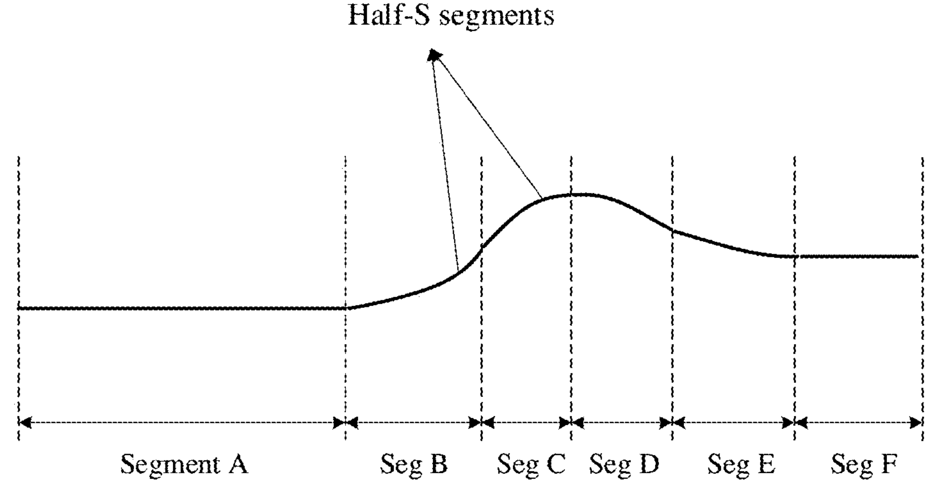
FIG. 3B is an exemplary illustration wherein trajectory path is represented as a plurality of half-S segments and a plurality of straight segments in accordance with some embodiments of the present disclosure.

FIG. 3B shows an example of trajectory plan with segments demarcation, wherein the plurality of segments of the trajectory path are broken-down into sub-segments called the unit trajectory sections. The unit trajectory sections have distinguished start and end points. In an embodiment, the terminal velocity and the acceleration of the autonomous vehicle 101 may be determined at these two points for generating the velocity profile distribution 213. In an embodiment, following rules may be applied to determine the break-up of trajectory path segments 211 into sub-segments or unit trajectory sections:

1. When moving in a straight path segment, the break-up is initiated at 5 meters or before start of any curve segment, whichever is lesser.
2. When moving in a curved path segment, the break-up is initiated at the minimum curvature points.
3. When transitioning from the curved path segment to the straight path segment, the break-up is initiated at 5 meters or at the straight path segment, whichever is lesser.

In an embodiment, once the segments are broken down into sub-segments, based on the above-mentioned rules, a unit trajectory section is determined for which the terminal velocity and the acceleration are calculated.

Figure 3C:
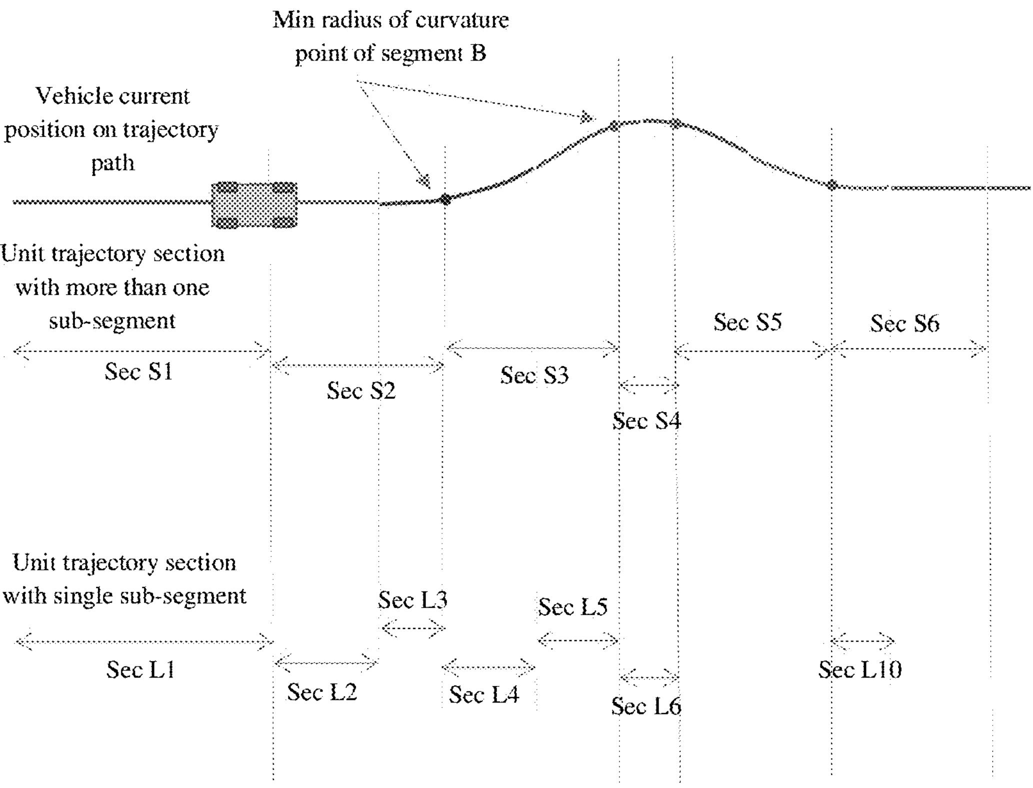
FIG. 3C shows a plurality of unit trajectory section of a trajectory path in accordance with some embodiments of the present disclosure.

In an embodiment, as shown in FIG. 3C, each smallest sub-segments of the trajectory path, (shown as sections L1, L2, L3, L4 in FIG. 3C) are the unit trajectory sections of the trajectory path. More than one sub-segment may be combined and considered as a unit trajectory section. For example, the sub-segments L2 and L3, which is a part of the end of L1 to the minimum radius of curvature point of the 4PL half-S curve of segment B, may be combined to form a unit trajectory section 'S2', as shown in FIG. 3C. Another example is when the end part of the half-S curve is combined with the first part of the next half-S curve, where both the half-S curves have equal radius of curvature, as shown in section S3 in FIG. 3C.

In an embodiment, the velocity and acceleration may be determined at the start and end of each unit trajectory section. At any point of time, one or more unit trajectory sections appear in front of the autonomous vehicle 101. At the start of an immediate and first unit trajectory section, the velocity-acceleration value pair may be determined from the current status of the velocity and acceleration of the autonomous vehicle 101.

Figure 4A:
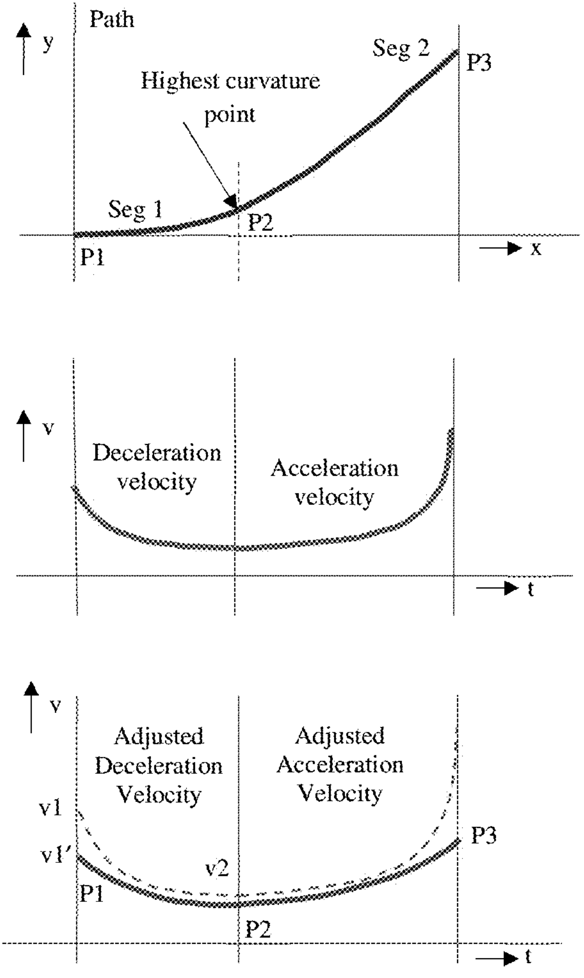
FIGS. 4A and 4B illustrate velocity distribution across half-S path segments in accordance with some embodiments of the present disclosure.
Figure 4B:
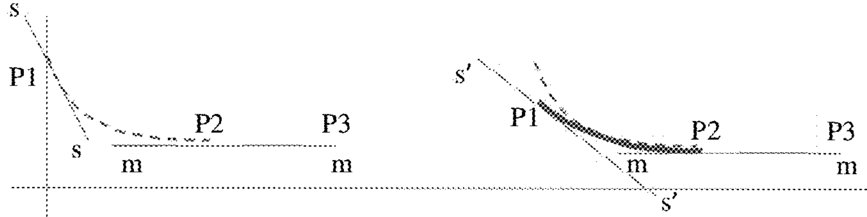

In an embodiment, to fulfill the objective of finding a precise trajectory path and necessary velocity profile distribution 213 on the trajectory path, a four-point logistic half-S curve may be used as a base component for the velocity-acceleration pair generation. The half-S curve may be divided into two parts at its highest curvature point. For each curved sub-segment, the terminal velocity-acceleration pair may be determined. Figures FIG. 4A and FIG. 4B illustrate generating the terminal velocity-acceleration pair for each sub-segments of the four-point logistic half-S curve, such as for sub-segments P1-P2, P2-P3. In an embodiment, the velocity limit may be determined based on the expression (1) below:

$$v < C * \sqrt{(\mu g / Ks)} \tag{1}$$

wherein:

'Ks' represents the curvature at any point,

μ indicates the friction coefficient of the road surface, and

'C' represents the experimental vehicle constraint coefficient

Further, in FIG. 4B, the line s-s represents the starting slope (i.e., the acceleration) and the line m-m represents the end slope (of acceleration) of P1-P2 segment for a velocity limit on the curve, where the autonomous vehicle 101 will not skid or is completely safe. Here, the slope is the measurement of the acceleration.

In an embodiment, to achieve a uniform gradual variation in the acceleration, while performing the velocity profile distribution 213, the 4PL curve distribution 305 of the velocity is determined from the segment P1-P2 (time or space separated). To modify the normal velocity distribution into a 4PL curve pattern, either the start slope, or the end slope (the non-zero slope side) may need to be adjusted. The slope adjustment will eventually drive the velocity adjustment. The velocity and slope adjustment may be performed parallelly using the expression (2) shown below:

$$B = \frac{2x_{i+1} \tan(\theta_{i+1}) - y_{i+1}}{y_{i+1}} \tag{2}$$

wherein:

B=(2*span*slope_diff−vel_diff)/(vel_diff) and 'B'>2

'span' can be distance or time

'slope_diff' is initially (mm-ss) and after adjustment (mm-s's')

'vel_diff' is initially |v1−v2| and after adjustment |v1'−v2|

In an embodiment, the final velocity at P1 may be determined as v1' and at P2 as v2', where v2' is zero acceleration velocity and v1' is derived based on the v2' using above expression, as shown in FIG. 4A. Once the terminal velocity is determined, the in-between velocity profile distribution 213 may be determined by the same 4PL curve distribution 305, as summarized in Table 1 below.

TABLE 1

| Sub-segment terminal point | Velocity | Acceleration |
|---|---|---|
| v at max curvature point | 0.4 * Vmax = v2' | Acc_zero |
| v at the end of section L4, L6 (refer FIG. 3C) | v1' | Derived based on curve length and velocity change above |

In an embodiment, for the straight sub-segment, the terminal velocity-acceleration determination may be relied on the basis of experimental results. For example, the maximum velocity on the straight sub-segment could be maximum achievable speed of the vehicle and the acceleration may be zero when the maximum velocity is achieved. In another scenario, when a curved sub-segment is approaching ahead of the straight sub-segment, the maximum velocity limit may be determined a few meters before the curved sub-segment starts. That is, based on the available length of the straight sub-segment, a maximum velocity point and a maximum velocity value may be determined.

In an embodiment, for an approaching curved sub-segment, the starting velocity (v1') may be determined as explained above. The maximum velocity on the previous straight sub-segment may be derived based on the v1' having somewhat higher value than v1'. Table 2 below provides an overall summary of determination of the velocity and acceleration limit at the junction of the unit trajectory section.

TABLE 2

| Sub-segment terminal point | Velocity | Acceleration |
|---|---|---|
| V at the straight sub-segment, where vehicle reached max velocity if distance available | Vmax | Acc_zero |
| V at the beginning of section S2 (refer FIG. 3C) | 1.5 * v1' * exp ($L_{straight}$) | Acc_zero |

I—Velocity Profile Generation for Unit Trajectory Section of Curved Sub-Segments In an embodiment, for a curved path sub-segment, the velocity profile generation may be categorized into following four categories:

1. The autonomous vehicle 101 is decelerating on a straight sub-segment and entering into a half-S curved path. The journey of the section L2 in FIG. 3C represents this.
2. The autonomous vehicle 101 is moving into the first part of half-S curve and moving to the second part of half-S curve (half-S curve is divided into its highest curvature point). The velocity and acceleration are depicted in case 2 of FIG. 4C. Also, the journey of section L3 in FIG. 3C represents this.
3. The autonomous vehicle 101 is moving into second part of half-S curve and moving to the first part of the next half-S curve sub-segment (half-S curve is divided into its highest curvature point). The velocity and acceleration depiction are show in case 3 of FIG. 4C. The chances of vehicle moving in the second part of half-S is rare. This can happen if the trajectory planning happens at a low rate or unit trajectory sections are very short and vehicle traverses the unit trajectory sections before the next revised trajectory plan is getting ready. The journey of the section L4 in FIG. 3C represents this.
4. The autonomous vehicle 101 is moving into the second part of the half-S curve and proceeding towards a straight sub-segment. The velocity and acceleration depiction is shown in case 4 of FIG. 4C below. The journey of section L10 in FIG. 3C represents this.

Figure 4C:
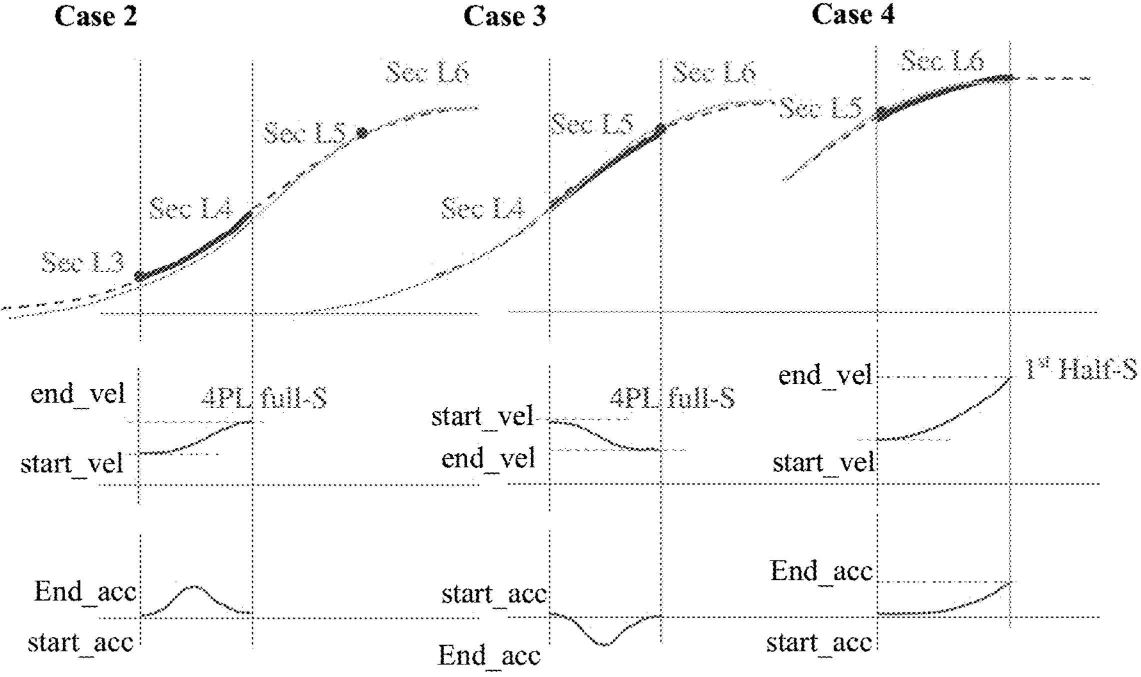
FIG. 4C illustrates velocity distribution on half-S trajectory sub-segments in accordance with some embodiments of the present disclosure.

In an embodiment, in FIG. 4C, the velocity 'v' and acceleration 'a' may be determined using the expressions (3) and (4) below:

$$v = ds/st \tag{3}$$

$$a = dv/dt \tag{4}$$

where, 's' is the half-S path.

II—Velocity Profile Generation for the Unit Trajectory Sections of Straight Sub-Segments For a straight sub-segment, the velocity profile generation may be categorized into two categories:

1. Autonomous vehicle 101 is running on a constant velocity. Then accelerate over a period of time (or over a distance which are related), and then again maintain that new velocity to drive. Alternatively, the autonomous vehicle 101 is starting the second part of a curved segment and entering a straight sub-segment as shown in 'Section S6' in FIG. 3C. [the velocity distribution is shown as an 'Green' curve on FIG. 4D]
2. The autonomous vehicle 101 is running on a constant velocity. Then deceleration (breaking) is applied over a period of time (or over a distance which are related), and then again maintain that new velocity to drive. Alternatively, the autonomous vehicle 101 is ending the journey (breaking) with a straight sub-segment and moving in a curved sub-segment till the highest curvature point as shown in 'Section S2' in FIG. 3C [velocity distribution is shown as 'Blue' curve in FIG. 4D].

Figure 4D:
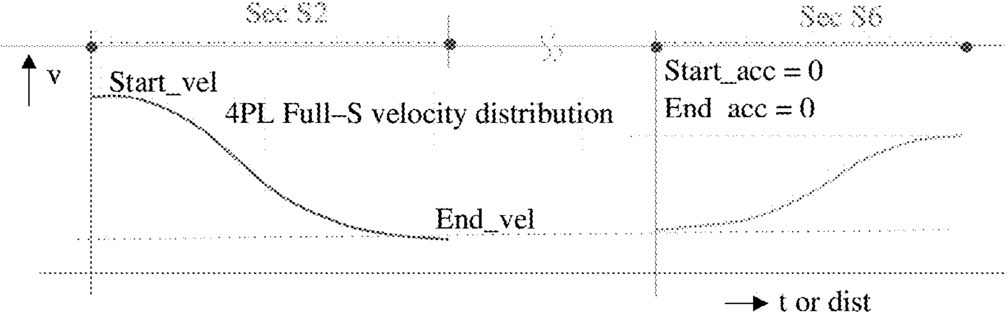
FIG. 4D illustrates velocity distribution on straight trajectory sub-segments in accordance with some embodiments of the present disclosure.

Further, as shown in FIG. 4D, the 4PL curve velocity distribution may be used for the straight segment journey as shown in expression (5) below:

$$v = vf - vf/\left(1 + (x/B)^{B}\right) \tag{5}$$

where:

'Vf' represents the final velocity

'x' represents the path points position and value of 'B' is computed using expression (6) below:

$$B = (2 * \text{x\_sep} * \text{slope\_diff} - \text{vel\_diff})/(\text{vel\_diff}) \tag{6}$$

where:

$$\text{'}B\text{' is} > 2$$

'X_sep & vel_diff' is calculated at the mid-point (where acceleration 'a' is zero) of full-S curve.

In an embodiment, a quadratic distribution of the steering angle for the straight or curved trajectory path segment or for a combined straight and curved trajectory path segment may be generated. For the steering profile generation, a separate segmentation of the path may be done so that the terminal steering speed and acceleration may be strategically determined at the terminal of those segments. Once the terminal steer velocity and acceleration is determined, a quadratic steering angle distribution profile may be determined.

Further, based on the velocity distribution profile for the trajectory path sub-segments and the steering angle distribution profile generated in the previous steps, a suitable motion command may be generated and applied to a vehicle controller. In an embodiment, the current position of the autonomous vehicle 101 may be determined on the HD map being used by the infotainment system of the autonomous vehicle 101 based on vision sensor data and the odometer and IMU data of the autonomous vehicle 101, after the motion command is applied to the vehicle controller. In an embodiment, the next base route 105 generation and trajectory planning may start from the new determined position.

Figure 5:
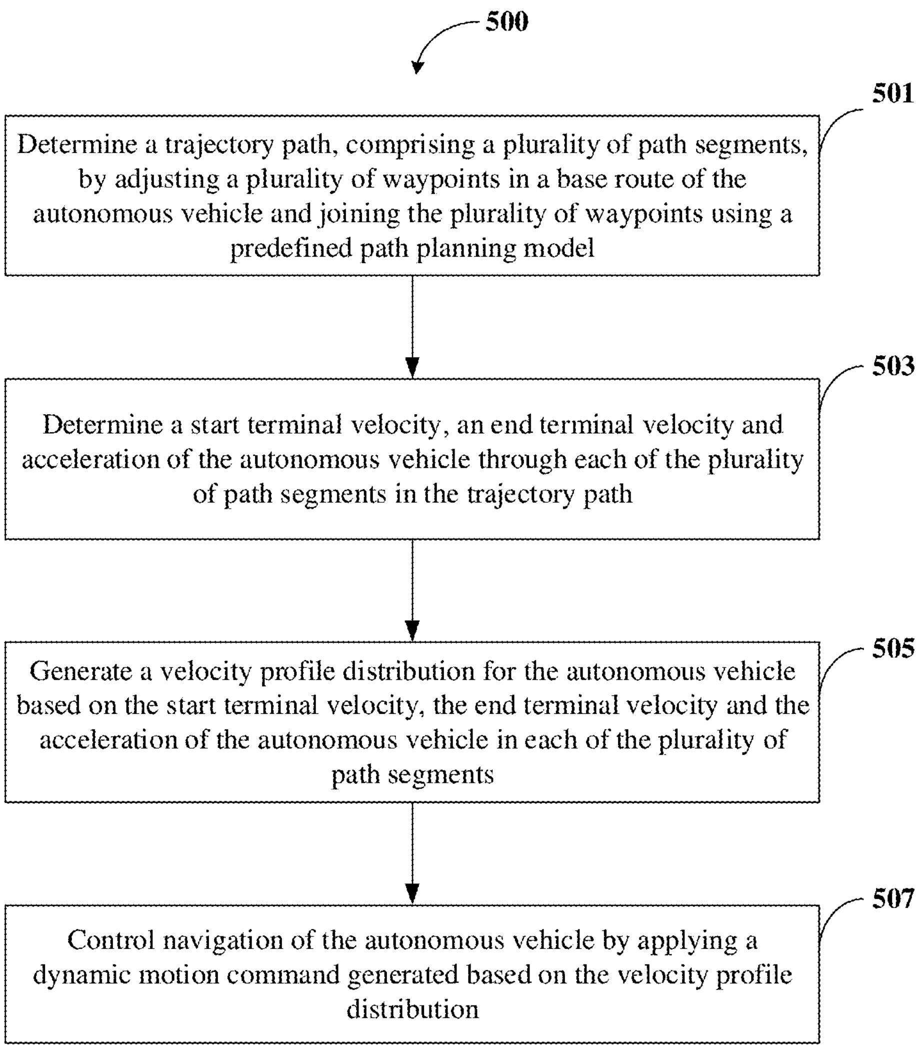
FIG. 5 shows a flowchart illustrating a method of dynamically controlling navigation of an autonomous vehicle in accordance with some embodiments of the present disclosure.

FIG. 5 shows a flowchart illustrating a method of dynamically controlling navigation of an autonomous vehicle 101 in accordance with some embodiments of the present disclosure.

As illustrated in FIG. 5, the method 500 may include one or more blocks illustrating a method of dynamically controlling navigation of an autonomous vehicle 101 using a navigation system 103 illustrated in FIG. 1.

At block 501, the method 500 includes determining, by the navigation system 103, a trajectory path by adjusting a plurality of waypoints 303 in a base route 105 of the autonomous vehicle 101 and joining the plurality of waypoints 303 using a predefined path planning model 221.

At block 503, the method 500 includes determining, by the navigation system 103, a start terminal velocity, an end terminal velocity and acceleration of the autonomous vehicle 101 through each of the plurality of path segments 211 in the trajectory path. In an embodiment, the start terminal velocity, the end terminal velocity and the acceleration of the autonomous vehicle 101 are sequentially determined starting from an immediate path segment that is in front of the autonomous vehicle 101.

At block 505, the method 500 includes generating, by the navigation system 103, a velocity profile distribution 213 for the autonomous vehicle 101 based on the start terminal velocity, the end terminal velocity and the acceleration of the autonomous vehicle 101 through each of the plurality of path segments 211 in the trajectory path.

At block 507, the method 500 includes dynamically controlling, by the navigation system 103, the navigation of the autonomous vehicle 101 by applying a dynamic motion command 215 which is generated based on the velocity profile distribution 213 of the autonomous vehicle 101.

Computer System

Figure 6:
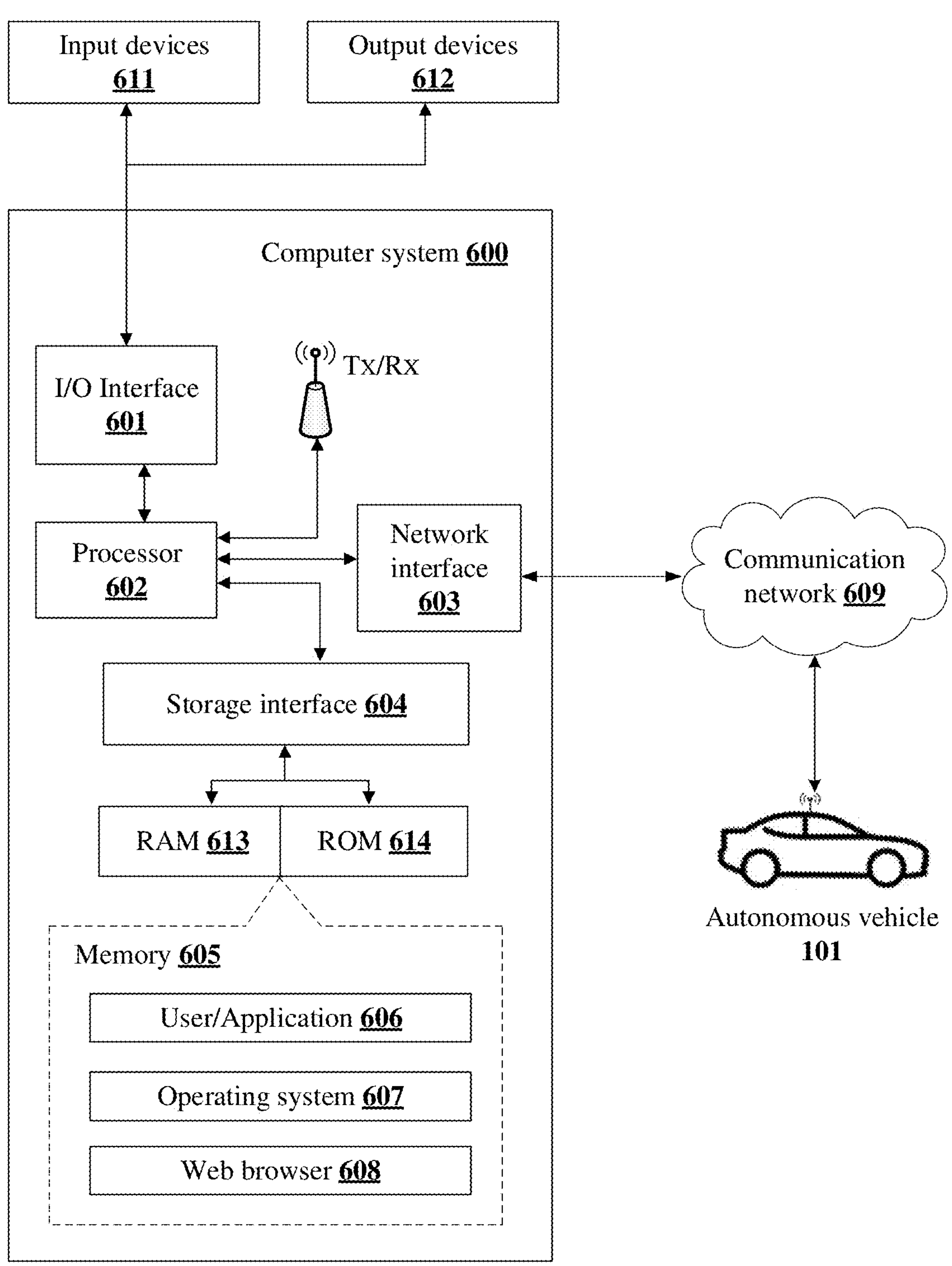
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be the navigation system 103 illustrated in FIG. 1, which may be used for dynamically controlling navigation of an autonomous vehicle 101. The computer system 600 may include a central processing unit ("CPU" or "processor") 602. The processor 602 may comprise at least one data processor for executing program components for executing user- or system-generated business processes. A user may include an owner of the autonomous vehicle 101, a driver, an automobile manufacturer, an organization or any system/sub-system being operated parallelly to the computer system 600. The processor 602 may include specialized processing units such as integrated system (bus) controllers, memory management control units, floating point units, graphics processing units, digital signal processing units, etc.

The processor 602 may be disposed in communication with one or more Input/Output (I/O) devices (611 and 612) via I/O interface 601. In some embodiments, the processor 602 may be disposed in communication with a communication network 609 via a network interface 603. The network interface 603 may communicate with the communication network 609. Using the network interface 603 and the communication network 609, the computer system 600 may connect with the autonomous vehicle 101 for collecting information related to the autonomous vehicle 101 and to provide dynamic motion commands 215 to the autonomous vehicle 101.

In an implementation, the communication network 609 may be implemented as one of the several types of networks, such as intranet or Local Area Network (LAN) and such within the organization. The communication network 609 may either be a dedicated network or a shared network, which represents an association of several types of networks that use a variety of protocols. In some embodiments, the processor 602 may be disposed in communication with a memory 605 (e.g., RAM 613, ROM 614, etc. as shown in FIG. 6) via a storage interface 604.

The memory 605 may store a collection of program or database components, including, without limitation, user/application interface 606, an operating system 607, a web browser 608, and the like. In some embodiments, computer system 600 may store user/application data 606, such as the data, variables, records, etc. as described in this invention.

The operating system 607 may facilitate resource management and operation of the computer system 600. The user interface 606 may facilitate display, execution, interaction, manipulation, or operation of program components through textual or graphical facilities. For example, the user interface 606 may provide computer interaction interface elements on a display system operatively connected to the computer system 600.

The web browser 608 may be a hypertext viewing application. Secure web browsing may be provided using Secure Hypertext Transport Protocol (HTTPS), Secure Sockets Layer (SSL), Transport Layer Security (TLS), and the like.

Advantages of the embodiments of the present disclosure are illustrated herein.

In an embodiment, the present disclosure helps in generating a dynamic velocity profile for the autonomous vehicles, wherein the dynamic velocity profile can be used for generating trajectory path segments for any driving scenarios like highway movement, narrow lane movement, factory or institutional campus movement, unorganized rough terrain movement etc.

In an embodiment, the proposed method helps in providing dynamic motion commands to the autonomous vehicle in terms of velocity variation, acceleration and deceleration on a trajectory path plan, based on which the vehicle can choose to be more aggressive on accelerating and decelerating, even in a curved path.

Moreover, the method of present disclosure enhances driving safety and provides better driving control for the autonomous vehicle.

As stated above, it shall be noted that the method and the navigation system of the present disclosure may be used to overcome various technical problems related to controlling navigation of autonomous vehicles. That is, the aforesaid technical advancements and practical applications of the proposed method may be attributed to the aspects of a velocity profile distribution for the autonomous vehicle based on a start terminal velocity, an end terminal velocity and acceleration of the autonomous vehicle through each of the plurality of path segments in the trajectory path, as disclosed in steps 2 of the independent claims 1 and 6 of the present disclosure.

In light of the technical advancements provided by the disclosed method and navigation system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 101 | Autonomous vehicle |
| 103 | Navigation system |
| 105 | Base route |
| 201 | I/O Interface |
| 203 | Processor |
| 205 | Memory |
| 207 | Data |
| 209 | Modules |
| 211 | Path segments |
| 213 | Velocity profile distribution |
| 215 | Dynamic motion command |
| 217 | Other data |
| 221 | Path planning model |
| 223 | Generating module |
| 225 | Command module |
| 226 | Vehicle Localization Module (VLM) |
| 227 | Other modules |
| 301 | Obstacles |
| 303 | Waypoints |
| 305 | 4PL curve distribution |
| 600 | Exemplary computer system |
| 601 | I/O Interface of the exemplary computer system |
| 602 | Processor of the exemplary computer system |
| 603 | Network interface |
| 604 | Storage interface |
| 605 | Memory of the exemplary computer system |
| 606 | User/Application |
| 607 | Operating system |
| 608 | Web browser |
| 609 | Communication network |
| 611 | Input devices |
| 612 | Output devices |
| 613 | RAM |
| 614 | ROM |

What is claimed is:

1. A method for dynamically controlling navigation of an autonomous vehicle, the method comprising:

determining, by a navigation system, a trajectory path, comprising a plurality of path segments including at least one curved path segment and a straight path segment, by adjusting a plurality of waypoints in a base route of the autonomous vehicle and joining the plurality of waypoints using a predefined path planning model;

determining, by the navigation system, a start terminal velocity, an end terminal velocity and acceleration of the autonomous vehicle through the at least one unit trajectory section of each of the plurality of path segments in the trajectory path;

generating, by the navigation system, a velocity profile distribution for the autonomous vehicle based on the start terminal velocity, the end terminal velocity and the acceleration of the autonomous vehicle between a first segment (P1) and a second segment (P2) that are separated in at least one of time or space, wherein generation of the velocity profile distribution for the autonomous vehicle comprises:

determining a Four-parameter logistic curve (4PL) distribution of the velocity from the first segment (P1)

to the second segment (P2) in the trajectory path, wherein the Four-parameter logistic curve (4PL) distribution of the velocity involves:

performing a slope and velocity adjustment on the at least one of: first segment (P1) to the second segment (P2) in the trajectory path, using the “B” parameter, wherein the “B” parameter is directly proportional to distance span of first segment (P1) to the second segment (P2) in the trajectory path; and controlling, by the navigation system, the navigation of the autonomous vehicle by applying a dynamic motion command generated based on the velocity profile distribution.

2. The method as claimed in claim 1, wherein the base route is generated using location information of the autonomous vehicle received through a Global Positioning System (GPS) associated with the autonomous vehicle and the predefined path planning model.

3. The method as claimed in claim 1, wherein determining the trajectory path comprises adjusting a position and an orientation of each of the plurality of waypoints to fit the plurality of waypoints to the Four-parameter logistic curve (4PL) distribution of the predefined path planning model.

4. The method as claimed in claim 1, wherein the start terminal velocity, the end terminal velocity and the acceleration of the autonomous vehicle are sequentially determined starting from an immediate path segment that is in front of the autonomous vehicle.

5. The method of claim 1, wherein each of the plurality of path segments are further broken up into at least one unit trajectory section by:

when moving in a straight path segment, initiating a break-up at 5 meters or before start of any curve segment, whichever is lesser, when moving in a curved path segment, initiating a break-up at the minimum curvature points, when transitioning from the curved path segment to the straight path segment, initiating a break-up at 5 meters or at the straight path segment, whichever is lesser.

6. A navigation system for dynamically controlling navigation of an autonomous vehicle, the navigation system comprising:

a processor; and a memory, communicatively coupled to the processor, wherein the memory stores processor-executable instructions, which on execution, cause the processor to:

determine a trajectory path, comprising a plurality of path segments including at least one curved path segment and a straight path segment, by adjusting a plurality of waypoints in a base route of the autonomous vehicle and joining the plurality of waypoints using a predefined path planning model;

determine a start terminal velocity, an end terminal velocity and acceleration of the autonomous vehicle through the at least one unit trajectory section of each of the plurality of path segments in the trajectory path;

generate a velocity profile distribution for the autonomous vehicle based on the start terminal velocity, the end terminal velocity and the acceleration of the autonomous vehicle through each of the plurality of path segments between a first segment (P1) and a second segment (P2) that are separated in at least one of time or space, wherein generation of the velocity profile distribution for the autonomous vehicle comprises:

determining a Four-parameter logistic curve (4PL) distribution of the velocity from the first segment (P1) to the second segment (P2) in the trajectory path, wherein the Four-parameter logistic curve (4PL) distribution of the velocity involves:

performing a slope and velocity adjustment on the at least one of: first segment (P1) to the second segment (P2) in the trajectory path, using the “B” parameter, wherein the “B” parameter is directly proportional to distance span of first segment (P1) to the second segment (P2) in the trajectory path; and control navigation of the autonomous vehicle by applying a dynamic motion command generated based on the velocity profile distribution.

7. A navigation system as claimed in claim 6, wherein the processor generates the base route using location information of the autonomous vehicle received through a Global Positioning System (GPS) associated with the autonomous vehicle and the predefined path planning model.

8. A navigation system as claimed in claim 6, wherein the processor determines the trajectory path by adjusting a position and an orientation of each of the plurality of waypoints to fit the plurality of waypoints to the 4PL curve distribution Four-parameter logistic curve (4PL) distribution of the predefined path planning model.

9. A navigation system as claimed in claim 6, wherein the processor sequentially determines the start terminal velocity, the end terminal velocity and the acceleration of the autonomous vehicle starting from an immediate path segment that is in front of the autonomous vehicle.

10. A non-transitory computer readable medium including instructions stored thereon that when processed by at least one processor, cause a navigation system to perform operations comprising:

determining a trajectory path, comprising a plurality of path segments including at least one curved path segment and a straight path segment, by adjusting a plurality of waypoints in a base route of the autonomous vehicle and joining the plurality of waypoints using a predefined path planning model;

determining a start terminal velocity, an end terminal velocity and acceleration of the autonomous vehicle through the at least one unit trajectory section of each of the plurality of path segments in the trajectory path;

generating a velocity profile distribution for the autonomous vehicle based on the start terminal velocity, the end terminal velocity and the acceleration of the autonomous vehicle between a first segment (P1) and a second segment (P2) that are separated in at least one of time or space, wherein generation of the velocity profile distribution for the autonomous vehicle comprises:

determining a Four-parameter logistic curve (4PL) distribution of the velocity from the first segment (P1) to the second segment (P2) in the trajectory path, wherein the Four-parameter logistic curve (4PL) distribution of the velocity involves:

performing a slope and velocity adjustment on the at least one of: first segment (P1) to the second segment (P2) in the trajectory path, using the “B” parameter, wherein the “B” parameter is directly proportional to distance span of first segment (P1) to the second segment (P2) in the trajectory path; and controlling navigation of the autonomous vehicle by applying a dynamic motion command generated based on the velocity profile distribution.

11. The non-transitory computer readable medium as claimed in claim 10, wherein the instructions cause the processor to generate the base route using location information of the autonomous vehicle received through a Global Positioning System (GPS) associated with the autonomous vehicle and the predefined path planning model.

12. The non-transitory computer readable medium as claimed in claim 10, wherein the instructions cause the processor to determine the trajectory path by adjusting a position and an orientation of each of the plurality of waypoints to fit the plurality of waypoints to the Four-parameter logistic curve (4PL) distribution of the predefined path planning model.

13. The non-transitory computer readable medium as claimed in claim 10, wherein the instructions cause the processor to sequentially determine the start terminal velocity, the end terminal velocity and the acceleration of the autonomous vehicle starting from an immediate path segment that is in front of the autonomous vehicle.

* * * * *